United States Patent
Okuhata

(10) Patent No.: US 11,011,954 B2
(45) Date of Patent: May 18, 2021

(54) MOTOR DRIVING UNIT

(71) Applicant: NIDEC TOSOK CORPORATION, Kanagawa (JP)

(72) Inventor: Yoshihisa Okuhata, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 92 days.

(21) Appl. No.: 16/581,740

(22) Filed: Sep. 24, 2019

(65) Prior Publication Data

US 2020/0106325 A1 Apr. 2, 2020

(30) Foreign Application Priority Data

Sep. 28, 2018 (JP) .............................. JP2018-183979

(51) Int. Cl.
| | |
|---|---|
| *H02K 5/12* | (2006.01) |
| *H02K 7/116* | (2006.01) |
| *H02P 27/06* | (2006.01) |
| *F16H 48/12* | (2012.01) |
| *H02K 9/00* | (2006.01) |

(52) U.S. Cl.
CPC .............. *H02K 5/12* (2013.01); *F16H 48/12* (2013.01); *H02K 7/116* (2013.01); *H02K 9/00* (2013.01); *H02P 27/06* (2013.01)

(58) Field of Classification Search
CPC . H02K 5/12; H02K 7/116; H02K 9/00; F16H 48/12; F16H 1/06; H02P 27/06
See application file for complete search history.

(56) References Cited

U.S. PATENT DOCUMENTS

| | | | | |
|---|---|---|---|---|
| 2004/0150271 | A1* | 8/2004 | Koga | ...................... F28D 1/035 310/64 |
| 2012/0153718 | A1* | 6/2012 | Rawlinson | ............ B60L 15/007 307/10.1 |
| 2016/0248302 | A1* | 8/2016 | Nagao | ..................... H02K 11/33 |
| 2017/0294821 | A1* | 10/2017 | Shimizu | ................... H02K 9/19 |

FOREIGN PATENT DOCUMENTS

JP 2012-140052 7/2012

* cited by examiner

*Primary Examiner* — Naishadh N Desai
(74) *Attorney, Agent, or Firm* — JCIPRNET

(57) ABSTRACT

Provided is a motor driving unit (1) capable of achieving space saving of a motor room and cost reduction of a vehicle. The motor driving unit (1) includes a motor (10), an inverter (50) that controls driving of the motor (10), and a transaxle (30). The inverter (50) is disposed at a position facing the second gear (32) in the transaxle (30) in a Z-axis direction of the motor (10), and a flow channel of refrigerant arranged inside the inverter (50) is partitioned off from an internal space of the motor (10) by a single barrier.

5 Claims, 5 Drawing Sheets

MOTOR DRIVING UNIT

CROSS-REFERENCE TO RELATED APPLICATION

This application claims the priority benefit of Japan application serial No. 2018-183979, filed on Sep. 28, 2018. The entirety of the above-mentioned patent application is hereby incorporated by reference herein and made a part of this specification.

BACKGROUND OF THE DISCLOSURE

Technical Field

The disclosure relates to a motor driving unit.

Related Art

Conventionally, there is known a motor driving unit including a motor, an inverter that controls driving of the motor, and a gear box that transmits a drive force of the motor to a wheel drive shaft of a vehicle.

For example, Patent Literature 1 discloses a motor driving unit including a motor, an inverter, and a transaxle serving as a gear box. The transaxle includes a first gear that receives a drive force of a motor shaft and rotates around an axial line of the motor shaft, a second gear, and a differential gear. The second gear has a large-diameter gear portion that intermeshes with the first gear and a small-diameter gear portion having a diameter smaller than that of the large-diameter gear portion, and the large-diameter gear portion intermeshes with the first gear. The second gear that receives a drive force from the first gear by the large-diameter gear portion transmits the drive force to the differential gear. The differential gear has a plurality of gear portions. One of the plurality of gear portions of the differential gear rotates around an axial line of a wheel drive shaft of a vehicle while intermeshing with the small-diameter gear portion of the second gear.

The inverter that controls driving of the motor is disposed above the motor driving unit.

LITERATURE OF RELATED ART

Patent Literature

Patent Literature 1: Japanese Laid-Open No. 2012-140052

In the motor driving unit disclosed in Patent Literature 1, a motor room of a vehicle needs to have an installation space of an oil cooler that cools motor cooling oil which is discharged from the motor, in addition to an installation space of the motor driving unit. In addition, in the motor driving unit, the motor room needs to have an installation space of an oil pump that circulates oil between the motor and the oil cooler. Further, in the motor driving unit, the motor room needs to have an installation space of the inverter. As a result, in the motor driving unit, a problem arises in that it is difficult to achieve space saving of the motor room.

SUMMARY

According to an exemplary embodiment of the disclosure, there is provided a motor driving unit including a motor, an inverter that controls driving of the motor, and a gear box that transmits a drive force of the motor to a wheel drive shaft of a vehicle. The gear box includes a first gear that receives the drive force of a motor shaft of the motor and rotates around an axial line of the motor shaft, a second gear that intermeshes with the first gear, and a differential gear, the differential gear having a gear portion that intermeshes with the second gear and rotates around an axial line of the wheel drive shaft. The inverter is disposed at a position facing the second gear in the gear box in an axial direction of the motor. A flow channel of refrigerant arranged inside the inverter is partitioned off from an internal space of the motor by a single barrier.

DESCRIPTION OF THE EMBODIMENTS

Figure 1:
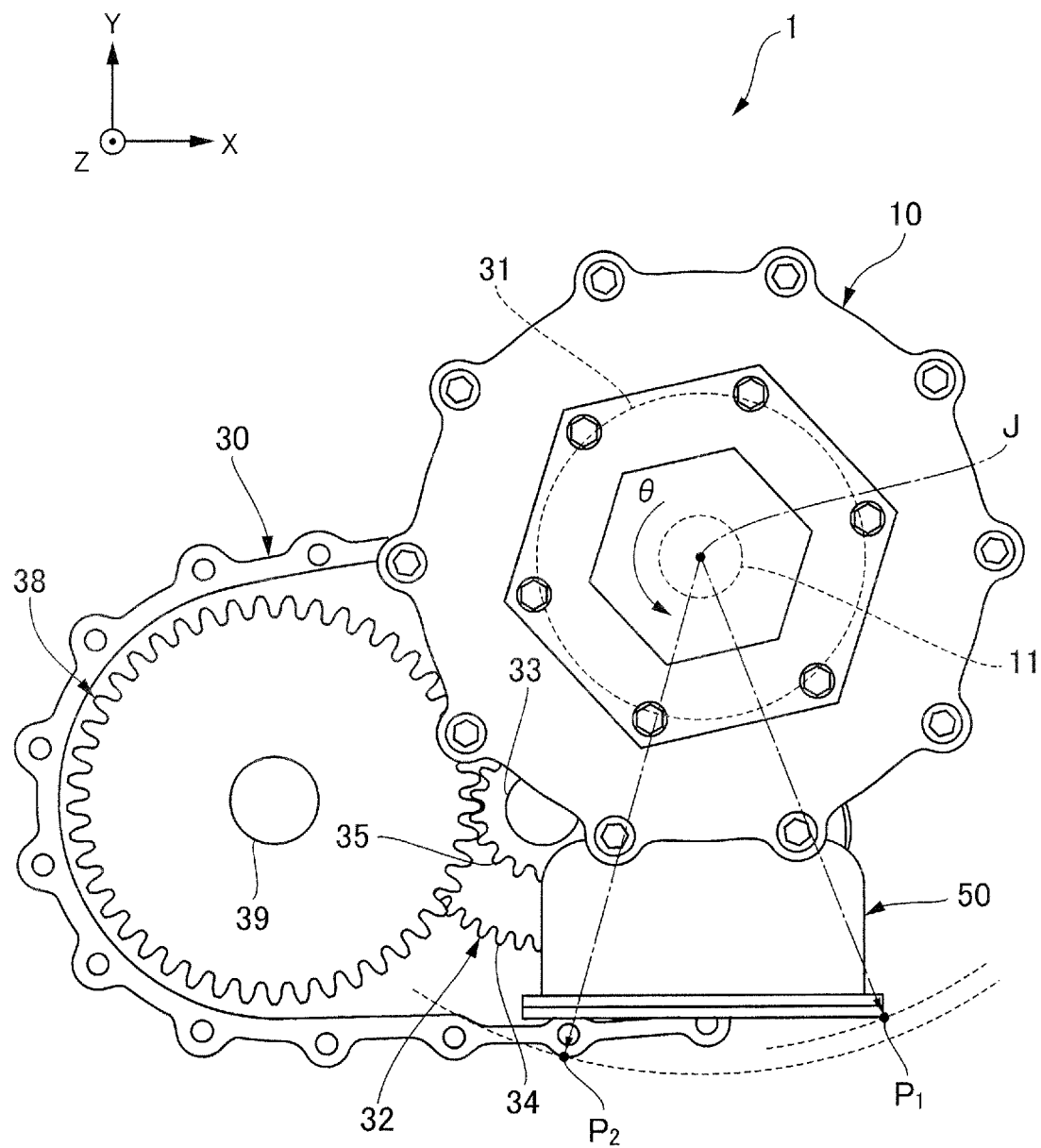
FIG. 1 is a front view of a motor driving unit according to an embodiment.

According to an exemplary embodiment of the disclosure, space saving in a motor room of a vehicle can be achieved. Further, installation of an oil pump and an oil cooler is unnecessary and a reduction in cost can also be achieved.

An embodiment of a motor driving unit according to the disclosure is described below with reference to the drawings. The motor driving unit is used as a driving source and a driving mechanism of an electric vehicle.

In the following drawings, in order to make each configuration easy to understand, the scale, the number and the like may be different in each structure and the actual structures.

In addition, in the drawings, an XYZ coordinate system is appropriately illustrated as a three-dimensional orthogonal coordinate system. In the XYZ coordinate system, the Z-axis direction is a direction parallel to an axial direction of a central axis J illustrated in FIG. 2. The X-axis direction is a direction parallel to a short-side direction of a motor 10 of a motor driving unit 1 illustrated in FIG. 1. The Y-axis direction is a direction orthogonal to both the X-axis direction and the Z-axis direction.

Figure 2:
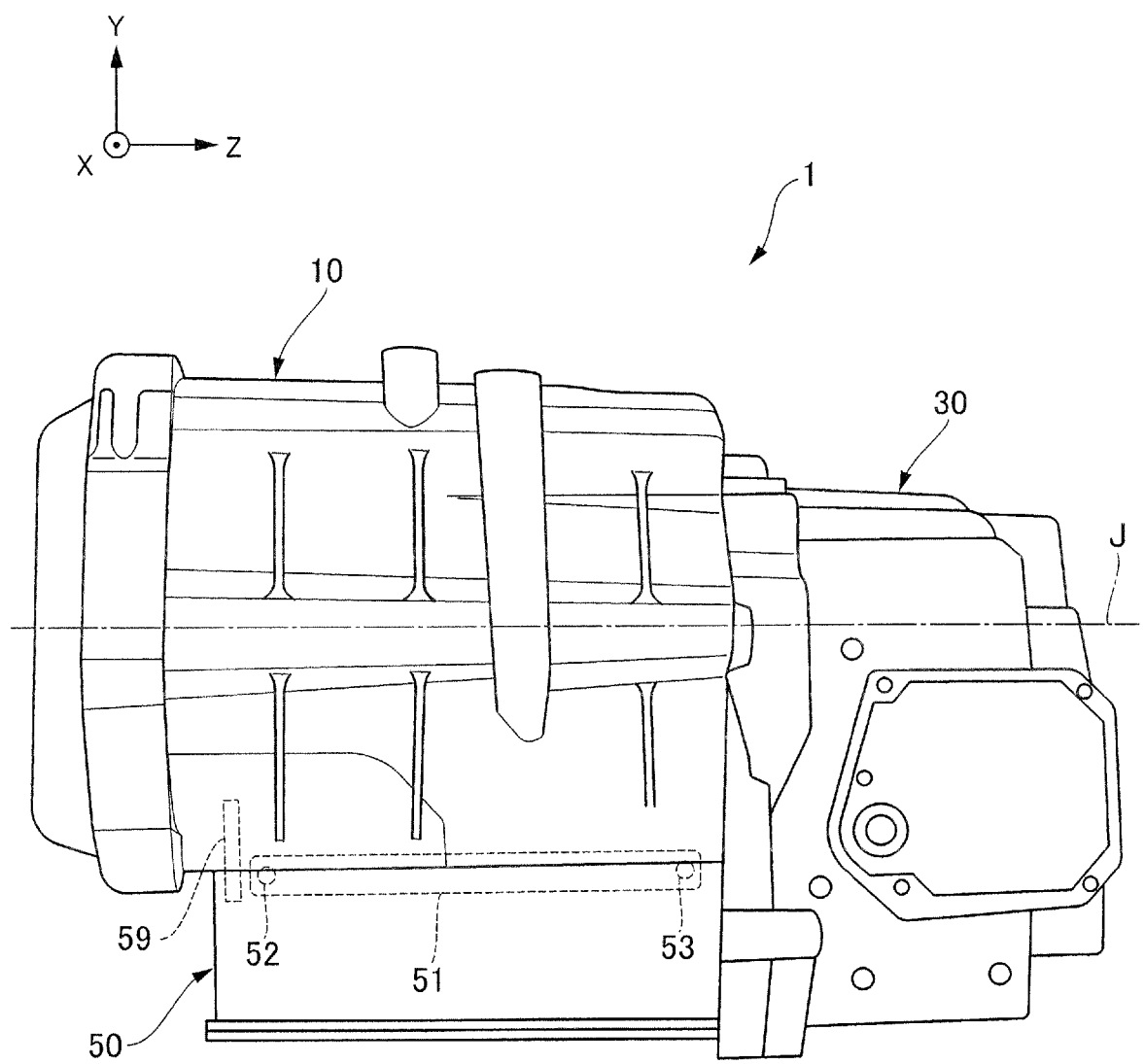
FIG. 2 is a side view of the motor driving unit.

In addition, in the following description, a positive side (+Z side) of the Z-axis direction illustrated in FIG. 2 is described as a "rear side", and a negative side (−Z side) of the Z-axis direction is described as a "front side". Besides, the rear side and the front side are terms which are merely used for description and do not limit an actual positional relationship or direction. In addition, unless otherwise noted, the direction (Z-axis direction) parallel to the central axis J is simply described as an "axial direction", the radial direction centred on the central axis J is simply described as a "radial direction", and the peripheral direction centred on the central axis J, that is, the axial periphery (θ direction in FIG. 1) of the central axis J is simply described as a "peripheral direction".

Moreover, in this specification, extending in the axial direction includes a case of extending in a direction inclined in a range of smaller than 45° with respect to the axial direction, in addition to a case of exactly extending in the axial direction (Z-axis direction). In addition, in this specification, extending in the radial direction includes a case of extending in a direction inclined in a range of smaller than 45° with respect to the radial direction, in addition to a case of exactly extending in the radial direction, that is, a direction perpendicular to the axial direction (Z-axis direction).

The axial direction (Z-axis direction) in the drawings corresponds to the axial direction in the disclosure. In addition, the front side of the axial direction in the drawings corresponds to one side in the axial direction in the disclosure. In addition, the rear side of the axial direction in the drawings corresponds to the other side of the axial direction in the disclosure.

Overall Configuration

FIG. 1 is a front view of the motor driving unit 1 according to the embodiment. FIG. 1 illustrates a transaxle 30 in a state in which a front cover is removed. FIG. 2 is a side view of the motor driving unit 1. As illustrated in FIG. 1 and FIG. 2, the motor driving unit 1 includes the motor 10, an inverter 50 that controls driving of the motor, and the transaxle 30 which is a gear box that transmits a drive force of the motor 10 to a wheel drive shaft of a vehicle.

Moreover, as illustrated in FIG. 1, the motor driving unit 1 is designed on the premise of being attached to a vehicle in a posture in which a second gear 32 is positioned below a first gear 31 in a direction of gravitational force. In FIG. 1, an outer surface of a lid cover of the inverter 50 faces directly downward.

Transaxle 30

In FIG. 1, the transaxle 30 includes the first gear 31, the second gear 32, and a differential gear 38. The first gear 31 receives a drive force of a motor shaft 11 of the motor 10 and rotates around an axial line of the motor shaft 11.

The second gear 32 has a large-diameter gear portion 34 and a small-diameter gear portion 35. Both the large-diameter gear portion 34 and the small-diameter gear portion 35 rotate around a second gear shaft 33. The second gear 32 receives a drive force from the first gear 31 by the large-diameter gear portion 34 that intermeshes with the first gear 31. The second gear 32 transmits the drive force to the differential gear 38 by the small-diameter gear portion 35.

The differential gear 38 configures an operating mechanism. FIG. 1 illustrates only a ring gear portion having the largest diameter in the differential gear 38, for convenience. The differential gear 38 has a pinion gear portion, a side gear portion, and the like, in addition to the ring gear portion. The ring gear portion rotates around a differential gear shaft 39. The wheel drive shaft of a vehicle rotates around the same axis as that of the differential gear shaft 39.

Inverter 50

The inverter 50 controls driving of the motor 10. The inverter 50 accommodates, in a housing, an electronic circuit board on which an insulated gate bipolar transistor (IGBT) or the like is mounted.

Figure 5:
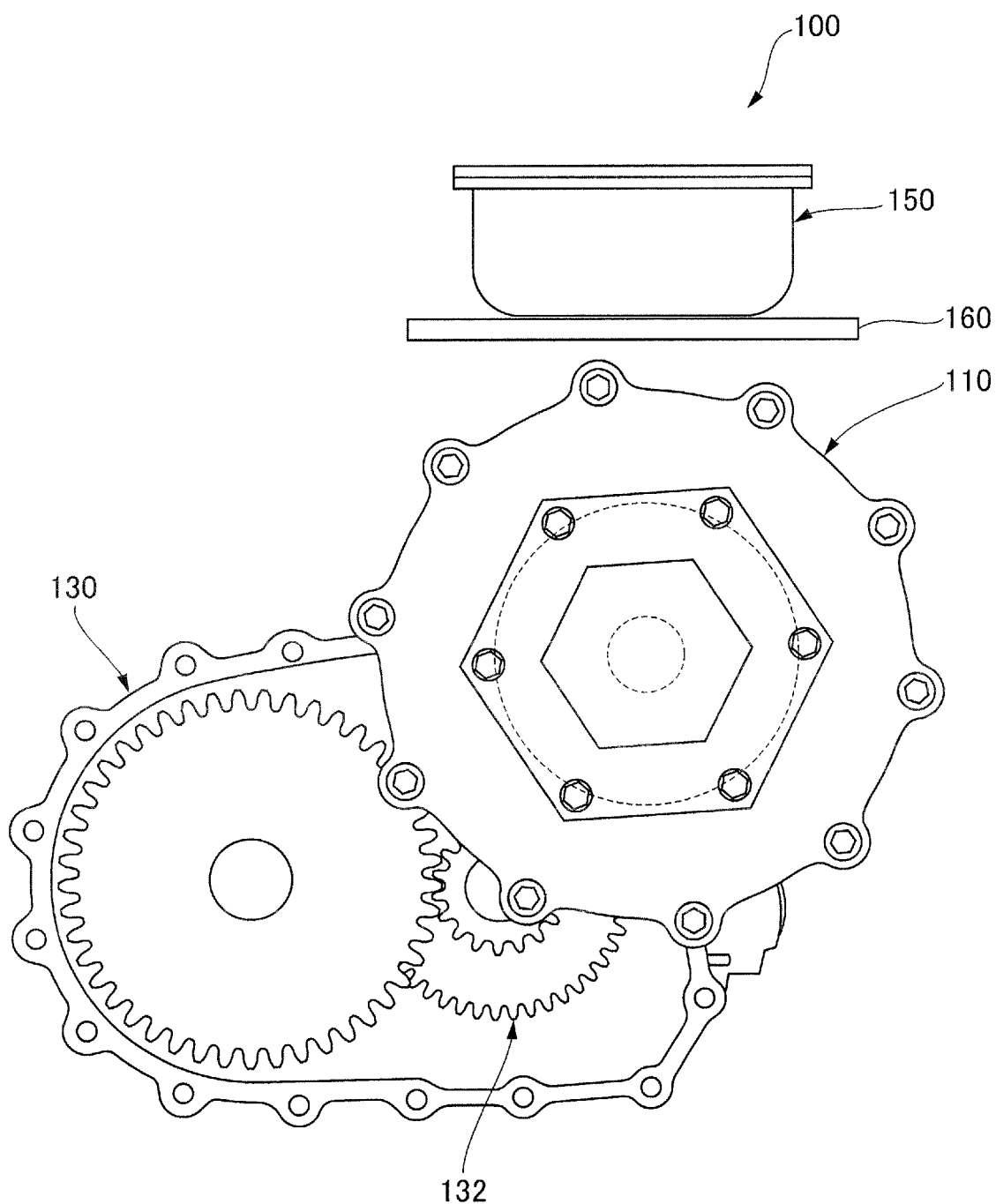
FIG. 5 is a front view illustrating a motor driving unit employing a structure of attaching an inverter to the motor driving unit disclosed in Patent Literature 1.

FIG. 5 is a front view illustrating a motor driving unit (hereinafter, referred to as comparative example 100) employing a structure of attaching an inverter to the motor driving unit disclosed in Patent Literature 1. In the comparative example 100, an inverter 150 is attached to a bracket 160 arranged above a motor 110 and takes up a dedicated installation space arranged above the motor 110.

A second gear 132 of a transaxle 130 is positioned on an outer side in a radial direction from an outer circumference of the motor 110. As illustrated in FIG. 5, a position which faces the second gear 132 in the axial direction on the periphery of the motor 110 is dead space.

On the other hand, as illustrated in FIG. 1, in the motor driving unit 1 according to the embodiment, the inverter 50 is disposed at the position on the periphery of the motor 110, the position facing the second gear 132 in the axial direction and being the dead space in the comparative example 100.

A dot-and-dash arrow in FIG. 1 represents the radial direction of the motor shaft 11. In addition, $P_1$ represents an end point indicating a site positioned at the outermost circumferential side in the radial direction of the motor shaft 11, among sites of the inverter 50. In addition, $P_2$ represents an end point indicating a site positioned at the outermost circumferential side in the radial direction of the motor shaft 11, among sites in a housing of the transaxle 30. The end point $P_1$ of the inverter 50 is positioned at an inner side from a circumference passing through the end point $P_2$ of the transaxle 30.

As illustrated in FIG. 2, the motor 10 is disposed at the front side in the Z-axis direction from the transaxle 30. An electronic board of the inverter 50 is electrically connected to a terminal of the motor 10 by wiring 59. The wiring 59 is disposed at a position at which a flow channel 51 of the inverter 50 is interposed between the transaxle 30 and the wiring in the Z-axis direction.

A refrigerant cooled by a radiator of a vehicle flows into the flow channel 51 through an inflow port 52 of the inverter 50. The refrigerant passing through the flow channel 51 is sent toward an external radiator through an outflow port 53 of the inverter 50.

Figure 3:
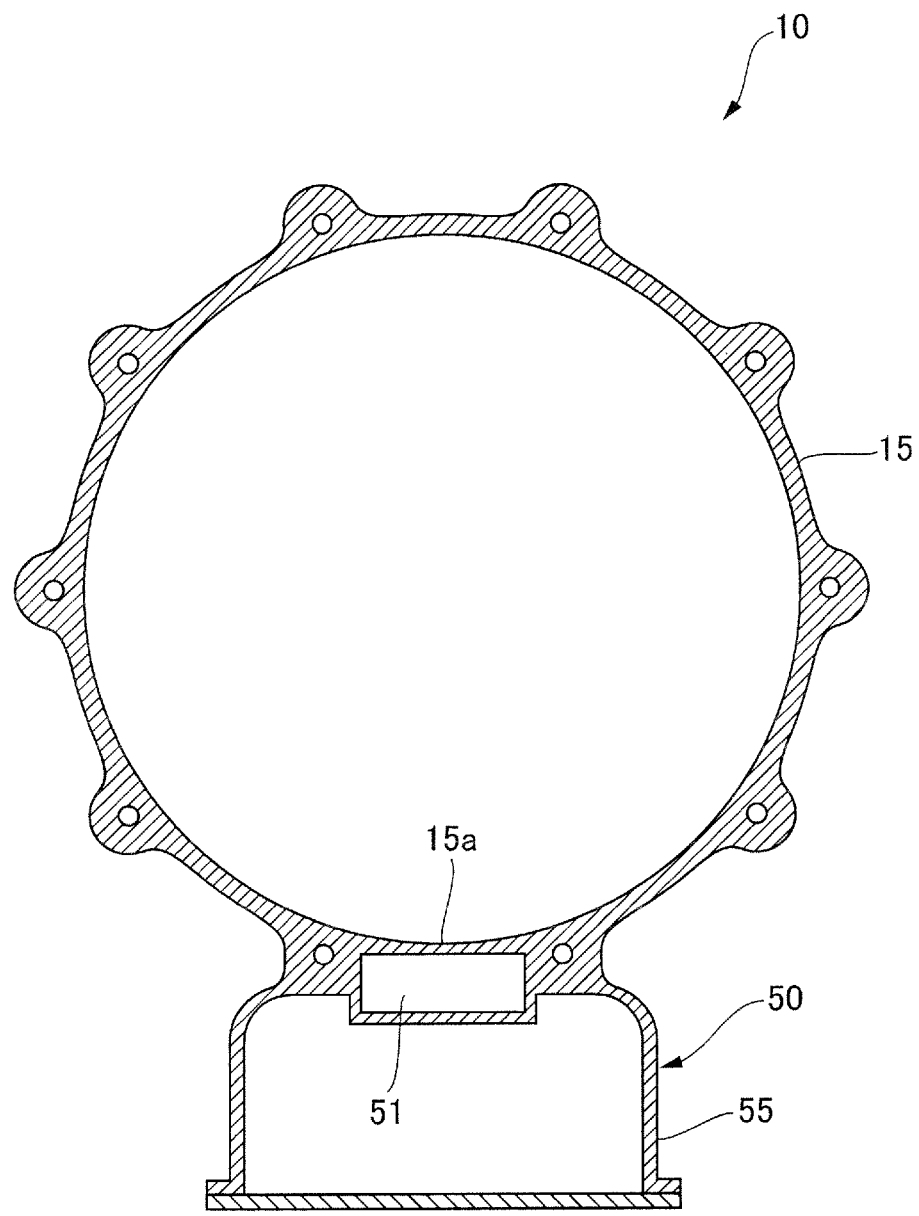
FIG. 3 is a cross-sectional view illustrating a motor housing of a motor and a casing of an inverter of the motor driving unit.

FIG. 3 is a cross-sectional view illustrating a motor housing 15 of the motor 10 and a casing 55 of the inverter 50 of the motor driving unit 1 according to the embodiment. The flow channel 51 is arranged in the casing 55 of the inverter 50, and a refrigerant for cooling the IGBT that is increased in temperature during motor driving flows in the flow channel. The IGBT is disposed to be in contact with a wall of the flow channel 51. As illustrated in FIG. 3, the motor housing 15 and the casing 55 of the inverter 50 are a part of a single member made of a casting product. A material of the casting product includes aluminum or the like. The flow channel 51 of the inverter 50 is partitioned off from an internal space of the motor housing 15 of the motor 10 by a single barrier 15a. The internal space of the motor housing 15 is a space in which a stator, a rotor, or the like is accommodated, and is also a storage portion that stores oil which flows in the motor housing 15 so as to cool the motor 10.

Operation Effect of Motor Driving Unit 1

(1) According to the motor driving unit 1, the inverter 50 is disposed at the position on the periphery of the motor, the position facing the second gear 32 in the axial direction and being the dead space in the related art, and thereby space saving of a motor room of a vehicle can be achieved. In addition, in the motor driving unit 1, the refrigerant flowing in the flow channel 51 of the inverter 50 cools the IGBT of the inverter 50 and cools the motor 10 via the barrier 15a which is a part of the motor 10. That is, in the motor driving unit 1, the flow channel 51 for cooling the inverter 50 also serves as a flow channel for cooling the motor 10, and thereby a dedicated cooling device for cooling the motor 10 is not required. Hence, according to the motor driving unit 1, also because it is not necessary to install a circulation channel, through which oil serving as a refrigerant is circulated between the motor 10 and the oil cooler, and an oil pump that applies a transfer force to the oil in the circulation channel, space saving can be achieved. Further, according to the motor driving unit 1, the circulation channel and the oil pump described above can be omitted to achieve a reduction in cost.

(2) In the motor driving unit 1, the refrigerant in the flow channel 51 of the inverter 50 cools oil stored in the internal space of the motor housing 15 via the barrier 15a. According to the motor driving unit 1, the oil cooled as described above in the motor housing 15 is circulated in the motor 10, and thereby the motor 10 can be efficiently cooled.

Moreover, as illustrated in FIG. 1, when the motor driving unit 1 is mounted on a vehicle in a posture in which the inverter 50 is positioned directly under the motor 10, refrigerants transferred to components accommodated in the motor housing 15 can be easily stored at a position of the barrier 15a by gravity. Hence, according to the motor driving unit 1, by employing the posture described above as a form of attaching the motor driving unit 1 to a vehicle, the oil in the motor housing 15 can be efficiently collected at the position of the barrier 15a to improve a cooling effect of the motor 10.

(3) In the motor driving unit 1, the wiring 59 is disposed at the position at which the flow channel 51 is interposed between the transaxle 30 and the wiring 59 in the Z-axis direction. This disposition enables an operator to electrically connect the inverter 50 and the motor 10 to each other without being obstructed by the transaxle 30. Hence, according to the motor driving unit 1, wiring workability for electrical connection of the inverter 50 to the motor 10 can be improved.

(4) In general, the motor driving unit 1 is mounted on a vehicle on condition that the motor driving unit does not poke out of a chassis of a vehicle at a ground side. In addition, in order to easily satisfy the condition described above, in general, the motor driving unit 1 employs a layout in which the end point $P_2$ of the housing of the transaxle 30 is positioned at the outermost circumferential side in the radial direction of the motor shaft 11. In the motor driving unit 1, in the radial direction of the motor shaft 11, the end point $P_1$ of the inverter is positioned at an inner side from the circumference passing through the end point $P_2$ of the housing of the transaxle 30. Hence, according to the motor driving unit 1, it is possible to easily satisfy the condition that the motor driving unit 1 mounted on a vehicle does not poke out of the chassis of the vehicle at the ground side.

Moreover, the end point $P_1$ of the inverter in the radial direction of the motor shaft 11 may be positioned on the circumference passing through the end point $P_2$ of the housing of the transaxle 30. In this configuration, the condition described above can also be easily satisfied.

A variant is described below in which part of the configuration of the motor driving unit 1 according to the embodiment is modified. Besides, unless otherwise noted below, a configuration of the motor driving unit 1 according to the variant is the same as that of the embodiment.

Figure 4:
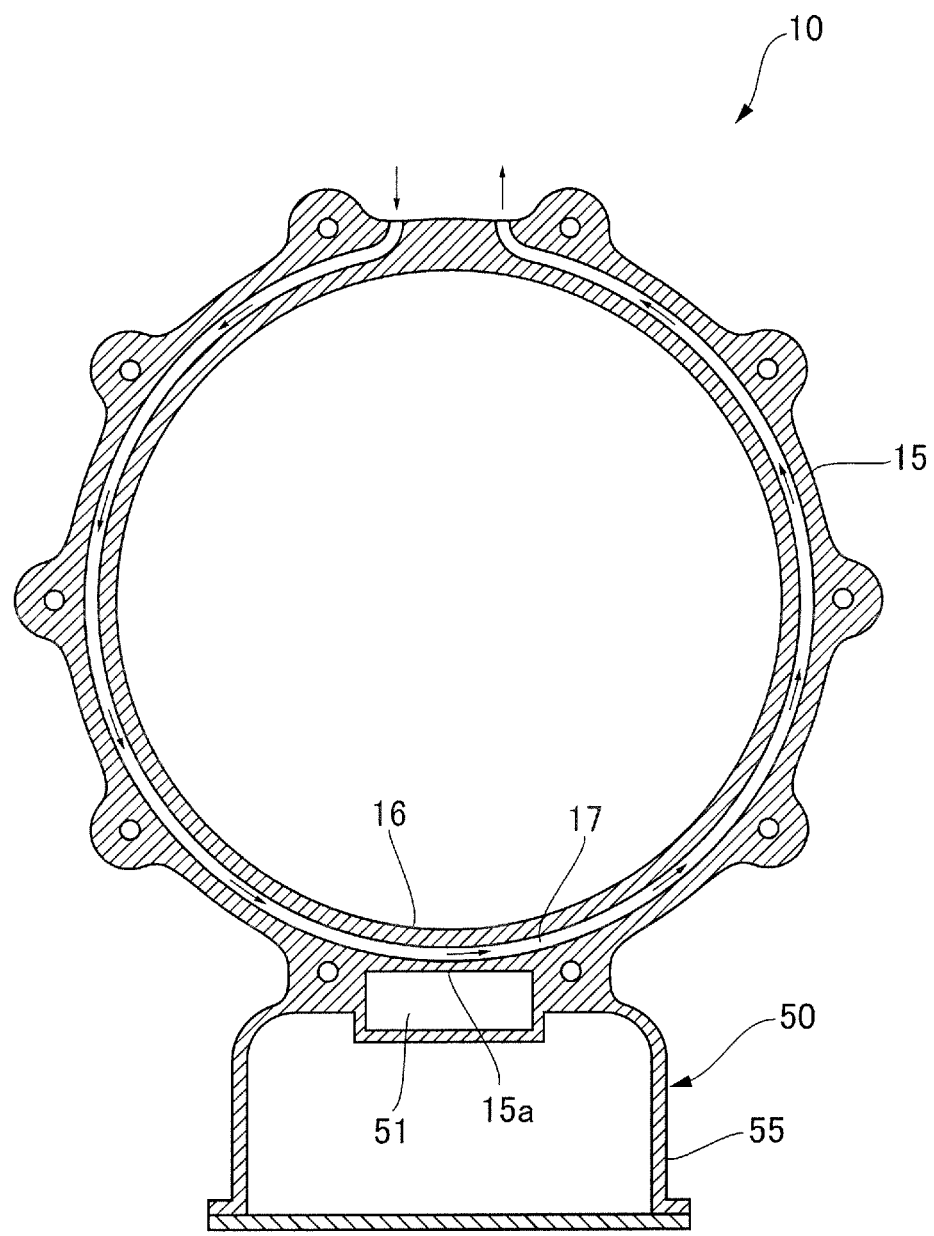
FIG. 4 is a cross-sectional view illustrating a motor housing of a motor and a casing of an inverter of a motor driving unit according to a variant.

FIG. 4 is a cross-sectional view illustrating the motor housing 15 of the motor 10 and the casing 55 of an inverter 50 of the motor driving unit 1 according to the variant. A structure of the motor housing 15 is a double-cylinder structure. An internal circulation channel 17 through which cooling oil is circulated in the motor housing 15 is arranged between a cylinder at an outer side and a cylinder at an inner side 16. Oil sent from an external oil pump flows into the internal circulation channel 17 from an inflow port arranged at an upper end of the motor housing 15 and flows in a counterclockwise direction in the drawing so as to reach the position of the barrier 15a. In this process, the oil cools substantially a half of the motor 10 in a peripheral direction. The oil cooled through contact with the barrier 15a flows in the counterclockwise direction in the drawing and flows out from an outflow port arranged at the upper end of the motor housing 15 so as to return to the oil pump. In this process, the oil cools substantially the remaining half of the motor 10 in the peripheral direction.

Operation Effect of Motor Driving Unit 1
According to Variant

In the motor driving unit 1, the refrigerant in the flow channel 51 of the inverter 50 cools oil in the internal circulation channel 17 at the position of the barrier 15a in the internal circulation channel 17 of the motor housing 15. According to the motor driving unit 1, the oil cooled as described above is circulated in the internal circulation channel 17, and thereby the motor can be efficiently cooled.

The embodiment and example of the disclosure are described above; however, the disclosure is not limited to the above-described embodiment and can be variously modified and altered within the scope of the gist of the disclosure. For example, the disclosure can also be applied to an electromagnetic valve used for opening and closing a flow channel of a liquid instead of being used for opening and closing a flow channel of a gas. The embodiment and the modifications thereof are included in the scope and the gist of the disclosure and are included in the disclosure described in the claims and equivalent scopes thereof.

What is claimed is:
1. A motor driving unit comprising:
a motor, an inverter that controls a driving of the motor, and a gear box that transmits a drive force of the motor to a wheel drive shaft of a vehicle;
wherein the gear box comprises a first gear that receives the drive force of a motor shaft of the motor and rotates around an axial line of the motor shaft, a second gear that intermeshes with the first gear, and a differential gear, the differential gear comprising a gear portion which intermeshes with the second gear and rotates around an axial line of the wheel drive shaft,
wherein the inverter is disposed at a position facing the second gear in the gear box in an axial direction of the motor, and
wherein a flow channel of a refrigerant arranged inside the inverter is partitioned off from an internal space of the motor by a single barrier.
2. The motor driving unit according to claim 1,
wherein the motor has a storage portion that stores an oil which flows in the motor, and
wherein the single barrier partitions off the storage portion of the motor from the flow channel of the inverter.
3. The motor driving unit according to claim 1,
wherein the motor has an internal circulation channel through which an oil is circulated in the motor, and
wherein the single barrier partitions off a predetermined region of the internal circulation channel in a refrigerant moving direction from the flow channel of the inverter.

4. The motor driving unit according to claim 1,
wherein the motor is disposed at one side in the axial direction from the gear box, and
wherein a wiring that electrically connects the inverter and the motor is disposed at a position at which the flow channel is interposed between the gear box and the wiring in the axial direction.

5. The motor driving unit according to claim 1,
wherein, in a radial direction of the motor shaft, an end point of the inverter is positioned on a circumference passing through an end point of the gear box or is positioned at an inner side from the circumference.

\* \* \* \* \*